United States Patent
Adkins et al.

(10) Patent No.: US 7,029,212 B2
(45) Date of Patent: Apr. 18, 2006

(54) CORNER GROUT CUTTER GUIDE

(75) Inventors: Edward Adkins, Rockford, IL (US); Patrick J. Barkdoll, Pecatonica, IL (US)

(73) Assignee: Nomis LLC, Rockford, IL (US)

( * ) Notice: Subject to any disclaimer, the term of this patent is extended or adjusted under 35 U.S.C. 154(b) by 0 days.

(21) Appl. No.: 10/883,262

(22) Filed: Jul. 1, 2004

(65) Prior Publication Data
US 2005/0002747 A1 Jan. 6, 2005

Related U.S. Application Data

(60) Provisional application No. 60/484,178, filed on Jul. 1, 2003.

(51) Int. Cl.
*B23C 1/20* (2006.01)

(52) U.S. Cl. ............ 409/180; 409/138; 409/143; 409/182; 144/136.95; 144/136.9

(58) Field of Classification Search ........... 409/180, 409/178–179, 181–182, 138, 143; 144/136.95, 144/154.5, 136.9
See application file for complete search history.

(56) References Cited

U.S. PATENT DOCUMENTS

| | | | | |
|---|---|---|---|---|
| 2,635,655 A * | 4/1953 | Linstead | ............ | 144/134.1 |
| 3,212,541 A * | 10/1965 | Burrows et al. | ............ | 144/134.1 |
| 3,285,135 A * | 11/1966 | Shaw | ............ | 409/180 |
| 3,421,411 A * | 1/1969 | Lowry et al. | ............ | 409/143 |
| 3,893,372 A * | 7/1975 | Strakeljahn | ............ | 409/180 |
| 4,504,178 A * | 3/1985 | Seidenfaden | ............ | 409/138 |
| 4,608,291 A * | 8/1986 | Gove | ............ | 409/180 |
| 4,988,245 A * | 1/1991 | Fukuda | ............ | 409/178 |
| 4,993,897 A * | 2/1991 | Anderhalden | ............ | 409/180 |
| 5,028,179 A * | 7/1991 | Grasset | ............ | 409/180 |
| D353,314 S * | 12/1994 | Jaslow | ............ | D8/70 |
| 5,522,684 A * | 6/1996 | Heck | ............ | 409/138 |
| 6,244,796 B1 * | 6/2001 | Schuebel et al. | ............ | 409/180 |

(Continued)

FOREIGN PATENT DOCUMENTS

DE    2527966 A1 *    1/1977

(Continued)

OTHER PUBLICATIONS

Additional canceled figures and canceled specification from file wrapper of D353,314 to Jaslow including Figures 7-14 and specification describing Figures 7-14, forms part of D353,314, cited above.*

(Continued)

*Primary Examiner*—Erica Cadugan
(74) *Attorney, Agent, or Firm*—Reinhart Boerner Van Deuren P.C.

(57) ABSTRACT

An apparatus and method are provided for guiding the bit of a rotary hand tool along a corner of a work surface formed by two or more abutting surfaces, through use of a corner cutting apparatus which includes a corner cutting guide having a housing, defining an axis of the housing, and adapted for attachment of the rotary tool with the axis of the rotary tool extending through the housing along the axis of the housing. The housing also includes first and second guide walls, for engaging abutting walls at a corner of the work surface. The first and second guide walls are disposed substantially perpendicular to one another, and have respective outer surfaces which, if projected, would intersect to form a line lying in a common plane with the axis of the housing and oriented at an acute angle to the axis of the housing.

12 Claims, 6 Drawing Sheets

U.S. PATENT DOCUMENTS 6,702,659 B1 * 3/2004 Moncrieff et al. .......... 451/358
2004/0240956 A1 * 12/2004 Bernardi et al. ............ 409/180

FOREIGN PATENT DOCUMENTS

EP 609174 A1 * 8/1994
FR 2520046 A1 * 7/1983

OTHER PUBLICATIONS

Dremel, *Grout Removal Attachment Kit Read Owner's Manual Before Operation*, undated, 1 page, Dremel, P.O. Box 1468 Racine, Wisconsin 53401, 1-800-437-3635, www.dremel.com.

* cited by examiner

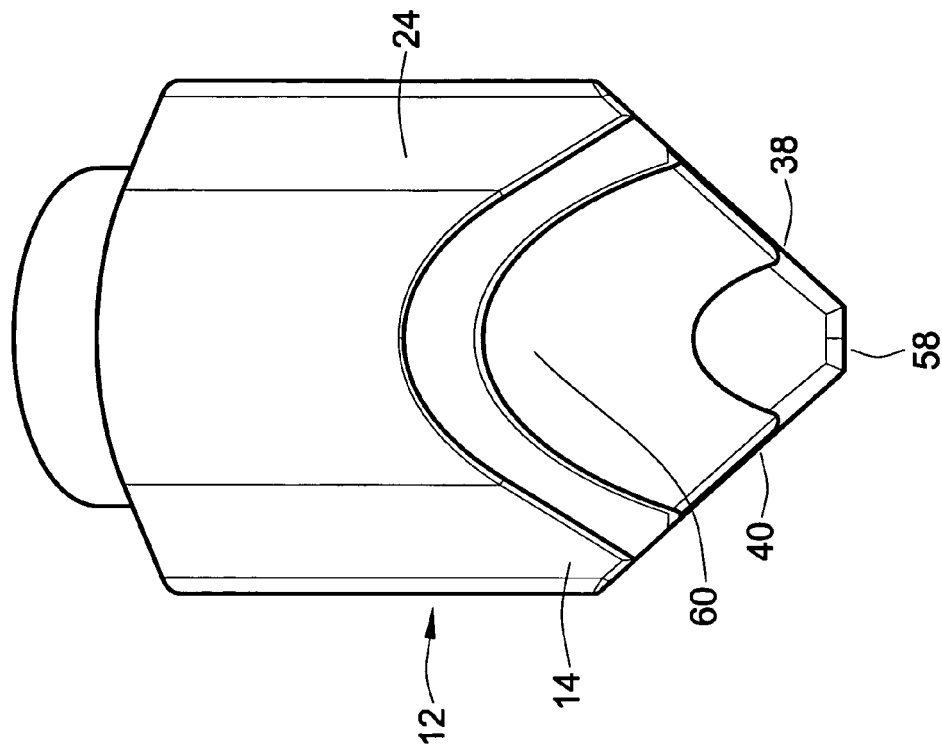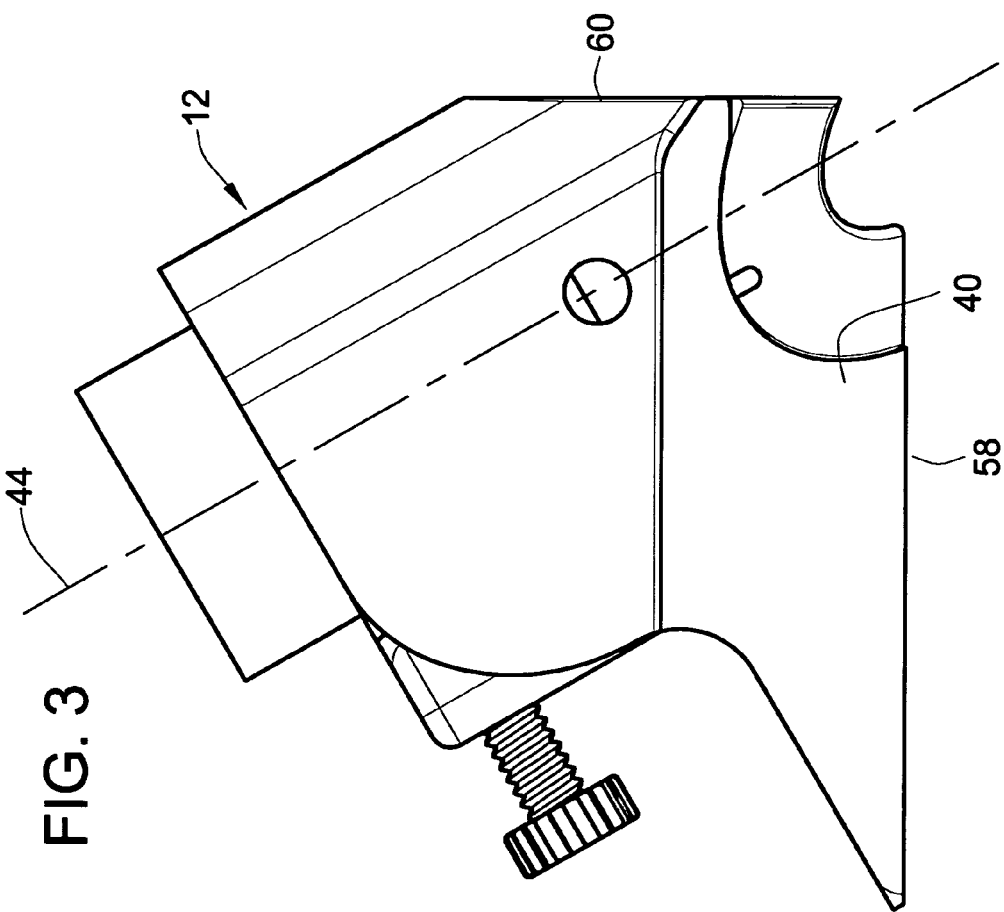

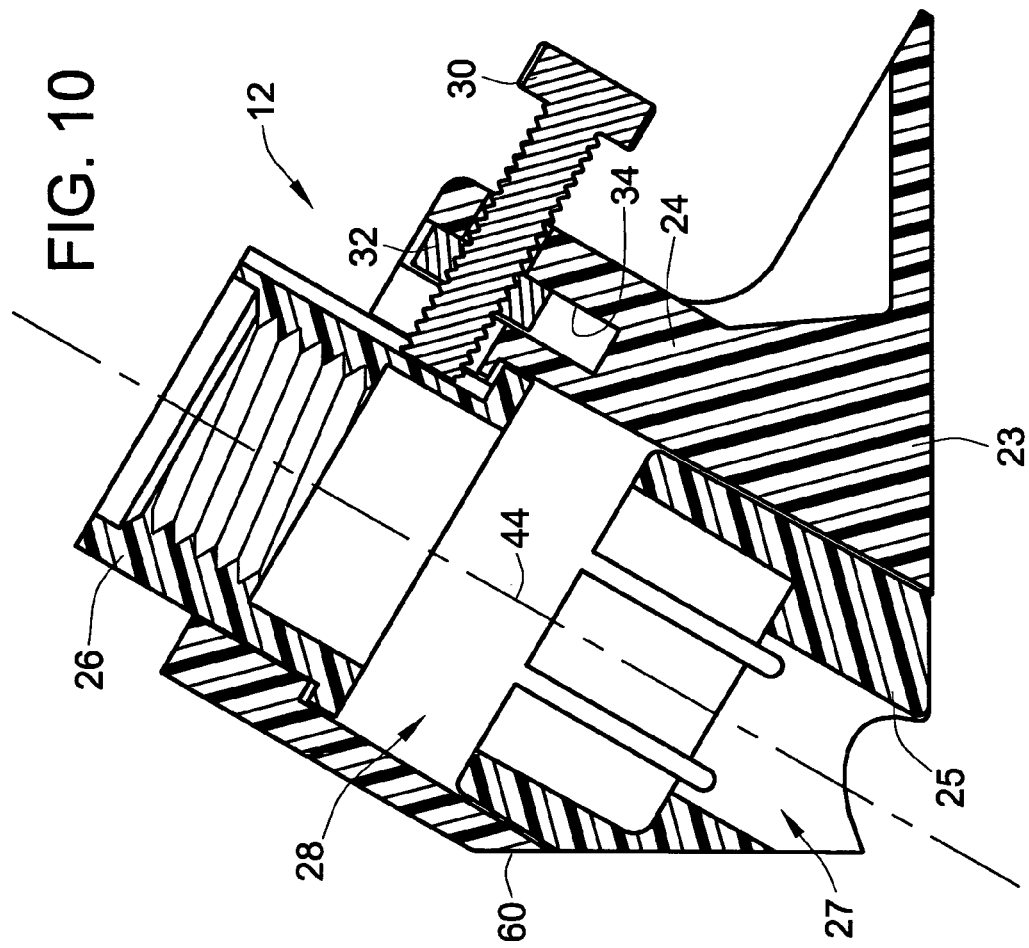
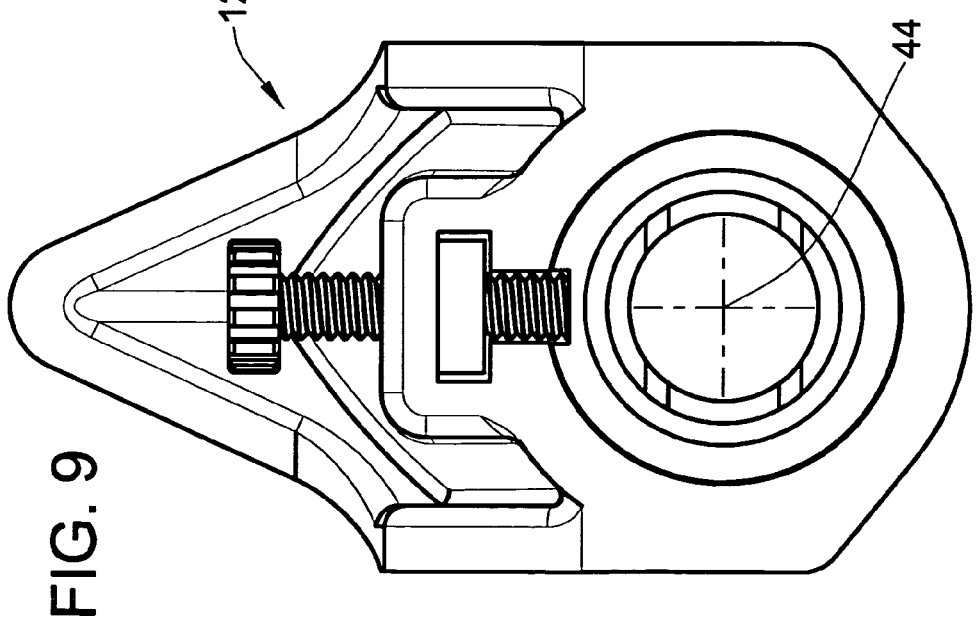

CORNER GROUT CUTTER GUIDE

CROSS-REFERENCE TO RELATED PATENT APPLICATIONS

This patent application claims the benefit of U.S. Provisional Patent Application No. 60/484,178, filed Jul. 1, 2003.

FIELD OF THE INVENTION

This invention relates to rotary hand tools, and more particularly to a corner cutting apparatus having removable corner cutting guide attachment apparatus for use with a rotary tool, that allows a bit of the rotary tool to be accurately guided along a corner for performing tasks such as removing grout from a corner of a tiled wall or floor.

BACKGROUND OF THE INVENTION

It is known to use a rotary hand tool for removing grout between tiles, and for providing a guide attachment to facilitate guiding the bit of the tool along grout lines on flat surfaces. U.S. Pat. No. 6,244,796, to Schuebel, discloses such a device.

Prior guide attachments, such as those disclosed by Schuebel, are configured only for use on flat surfaces, however, and cannot be used for removing grout from a corner. It is desirable to provide an apparatus and method for guiding a rotary hand tool along a corner of a work surface, during tasks such as removing grout from a corner joint formed by tiles on abutting walls of the work surface.

BRIEF SUMMARY OF THE INVENTION

The invention provides an improved apparatus and method for guiding the bit of a rotary hand tool along a corner of a work surface, through use of a corner cutting guide. The corner cutting guide may be configured for guiding the bit into a corner of the work surface formed by three abutting planar surfaces, such as might be encountered at the common juncture of two walls with a floor or a ceiling.

In one form of the invention, a corner cutting guide is provided for a rotary hand tool that includes an outer enclosure and a collet that is rotatable about an axis of the rotary tool and adapted for receiving a bit for engaging a work surface. The corner cutting guide includes a housing, defining an axis of the housing, and adapted for attachment of the rotary tool with the axis of the rotary tool extending through the housing along the axis of the housing. The housing also includes first and second guide walls, for engaging abutting walls at a corner of the work surface. The first and second guide walls of the housing are disposed substantially perpendicular to one another, and have respective outer surfaces which, if they were projected, would intersect to form a line lying in a common plane with the axis of the housing and oriented at an acute angle to the axis of the housing. A forwardmost surface of the corner cutting guide may be configured so that it does not extend forward of an intersection formed by the axis of the housing and the line formed by the intersections of the projected outer surfaces of the first and second guide walls of the housing.

The included angle formed by the outer surfaces of the guide walls may be bisected by the common plane including the axis of the housing and the line formed by the intersection of the outer surfaces of the guide walls of the housing. The outer surfaces of the guide walls may be perpendicular to one another, or disposed at some other angle with respect to one another. The included angle formed by the outer surfaces of the guide walls may also be slightly less than perpendicular. The intersection of the guide wall outer surfaces may also be blunted along a portion of the intersection.

In another form of the invention, a corner cutting apparatus includes a rotary hand tool including a corner cutting guide, according to the invention.

Other aspects, objectives and advantages of the invention will be apparent from the following detailed description and the accompanying drawings.

BRIEF DESCRIPTION OF THE DRAWINGS

FIGS. 3, 4, 5 are left hand side, front and right hand side views of the corner grout cutter guide shown in FIG. 1.

FIG. 9 is an isometric view of the corner grout cutter guide shown in FIG. 1 looking down along the cutting axis.

FIG. 10 is a cross section of the corner grout cutter guide shown in FIG. 1.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 11:
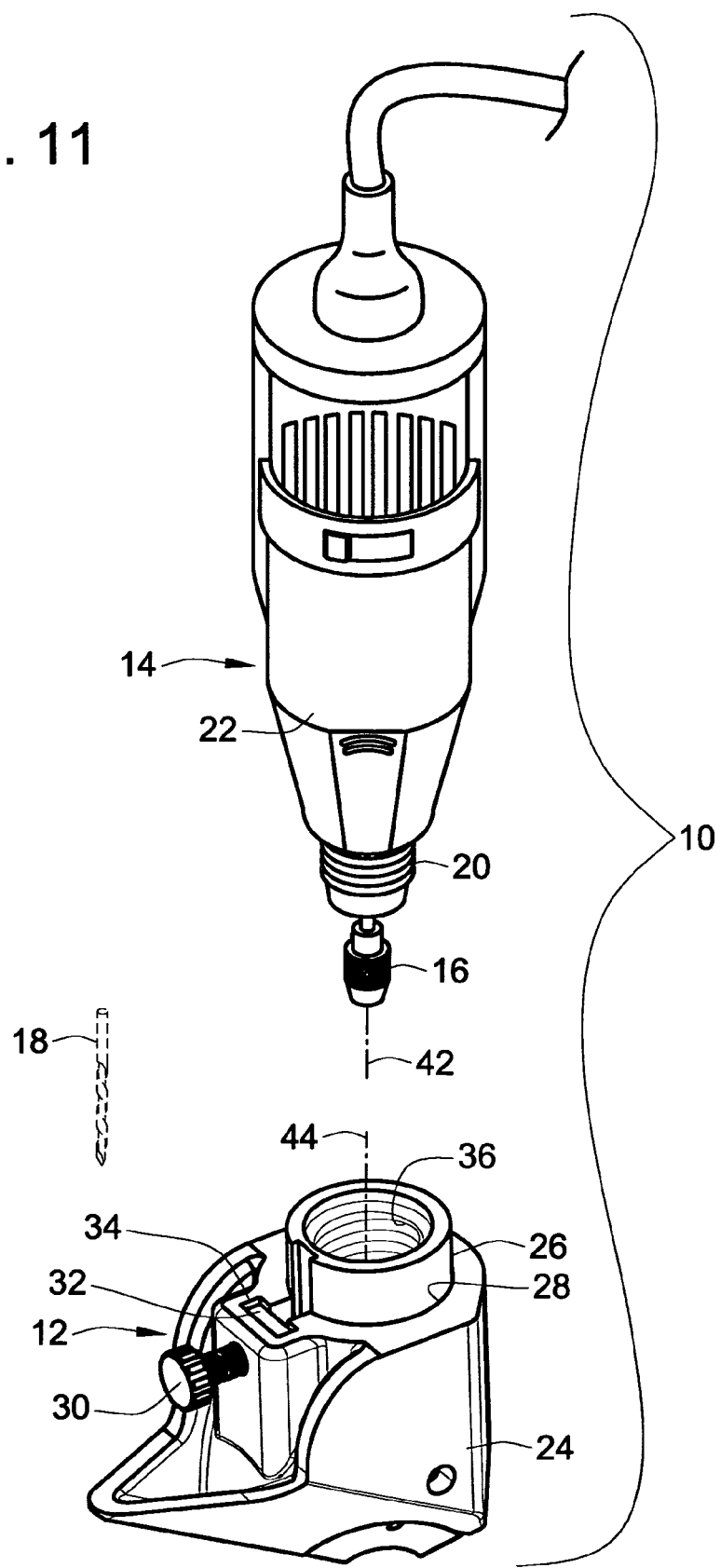
FIG. 11 is a partially exploded isometric illustration of a corner cutting apparatus, according to the invention, indicating how the corner grout cutter guide of FIGS. 1–10 is removably mounted to an exemplary rotary tool of the corner cutting apparatus.

FIGS. 1–11 show an exemplary embodiment of a corner cutting apparatus 10, and a corner cutting guide 12, according to the invention. Referring to FIG. 11, the corner cutting apparatus 10 includes a rotary hand tool 14 and the corner cutting guide 12.

In the exemplary embodiment of the corner cutting apparatus 10, the corner cutting guide 12 takes the form of a corner grout cutter guide, as shown in the drawings that can be releasably mounted to the rotary tool 14. In the exemplary embodiment, the rotary tool 14 is shown in a well known form of a typical, so called, Dremelt® rotary tool.

Such rotary tools 14 typically comprise a chuck or collet 16 that drives a rotary bit 18. In the exemplary embodiment, the rotary hand tool 14 also includes threading 20 at one end of an outer enclosure 22, or handle, of the rotary tool 14, that is adapted to connect the rotary tool 14 to cutter guides, such as the corner grout cutter guide 12 of the exemplary embodiment.

Figure 8:
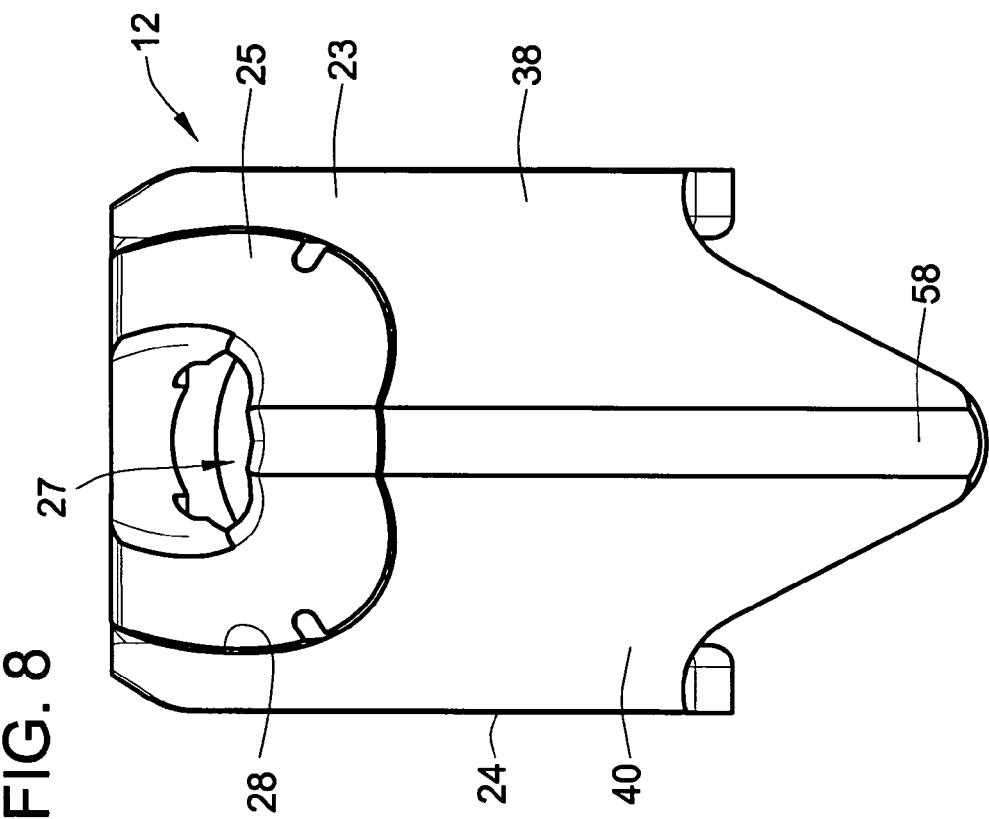
FIG. 8 is a bottom view of the corner grout cutter guide shown in FIG. 1.
Figure 7:
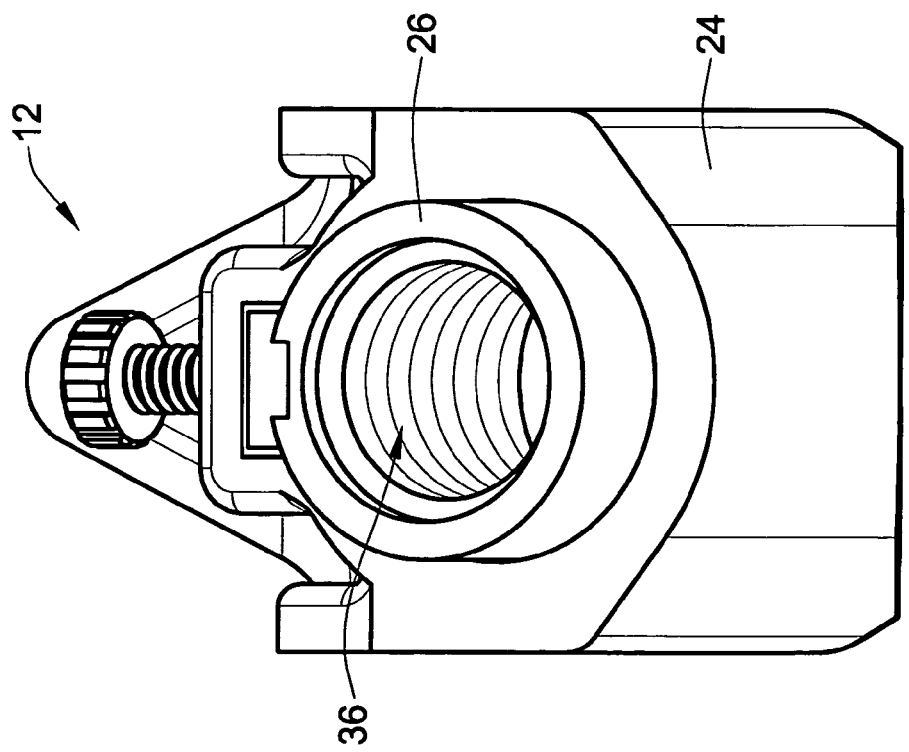
FIG. 7 is a top view of the corner grout cutter guide shown in FIG. 1.

Referring the drawings generally, the exemplary embodiment of the corner grout cutter guide 12 includes a housing 24 and a plastic molded mounting sleeve 26. As shown in FIGS. 8 and 10, the housing 24 of the exemplary embodiment is formed from two parts, an outer shell 23 of molded plastic, which defines a central cylindrical opening 28 of the housing, and a clear plastic insert 25 that is inserted into a lower end of the central cylindrical opening 28 in the housing 24, and locked in place by a spring catch. The insert 25 defines a hole 27, for passage of the bit 18 through the insert 25. The sleeve 26 is slidably mounted in the upper end of the central cylindrical opening 28 of the housing 24 to provide for linear depth adjustment of the bit 18.

The corner cutting guide 12 also includes a thumb screw 30 can be tightened and loosened to thereby act as a clamp for releasably securing the mounting sleeve 26 to the housing 24 of the corner cutting guide 12 at desired depths. A nut 32, supported in a groove 34 of the housing 24, secures the thumb screw 30.

The mounting sleeve 26 includes a threaded hole 36 that is adapted to receive the threads 20 of the outer enclosure 22 of the rotary tool 14, as shown in FIG. 11. The central opening 28 in the housing 24 and the threaded hole 36 in the sleeve 26, in combination with the hole 27 in the insert 25, form a central through hole that extends through the entire corner cutting guide 12, for allowing the bit 18 of the rotary tool 14 to contact the desired working surface in a corner formed by two or more abutting walls of the work surface. The housing 24 is configured to position the surface engaging bit 18 into corners, and can be used for such tasks as engaging, cleaning and/or removing grout from such corners.

Figure 5:
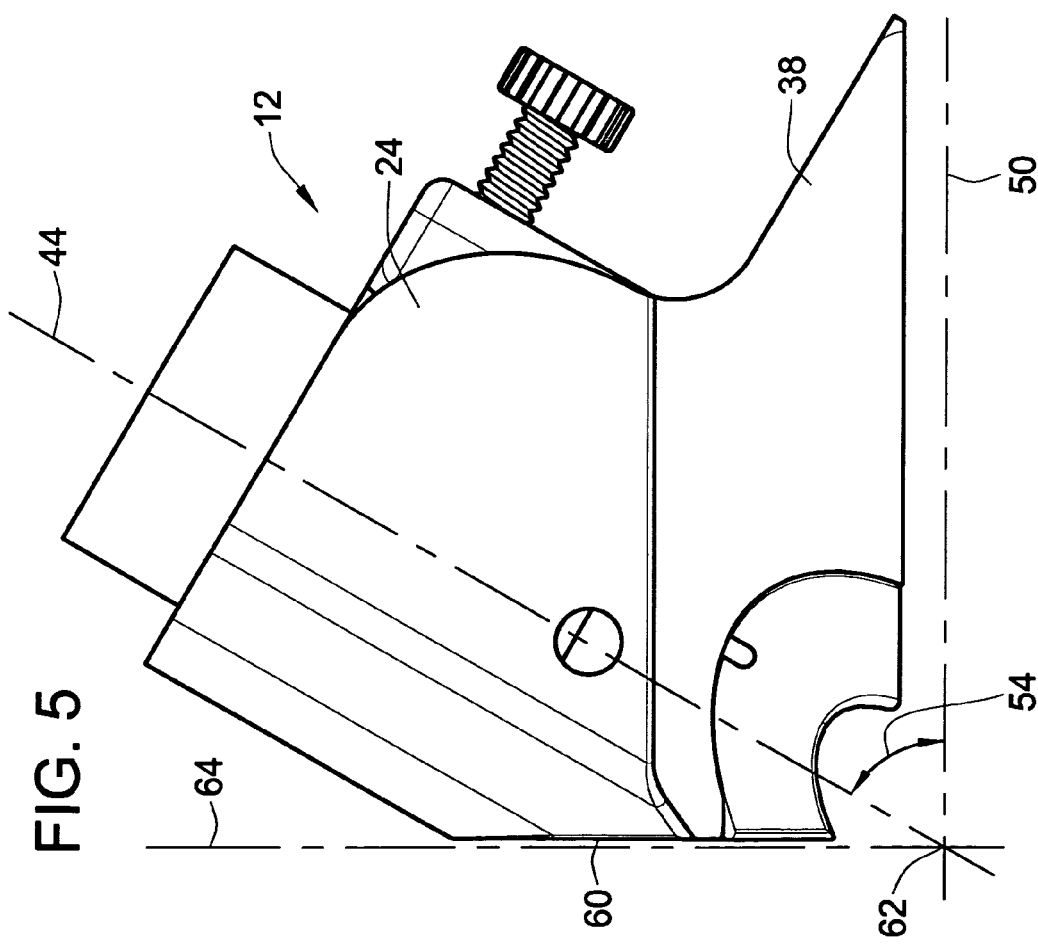

As shown in FIGS. 3–5, the housing 24 of the corner cutting guide 12 includes a pair of guide walls 38, 40 that are oriented approximately perpendicular to one another, and more preferably slightly less than perpendicular to one another, which are adapted to slide against generally perpendicular wall surfaces which define a corner to be worked. By being slightly less than perpendicular, the guide walls 38, 40 of the housing 24 more easily fit into tight corners and better accommodate situations where walls are not perfectly perpendicular or have shifted over time.

As shown in FIG. 11, the collet 16 of the rotary hand tool 14 is rotatable about an axis 42 of the rotary tool 14. As shown in FIGS. 3, 5, and 9–11, the housing 24 of the corner cutting guide 12 also defines an axis 44 which, when the rotary tool 14 is installed in the corner cutting guide 12, is nominally and essentially coincident with the axis 42 of the rotary hand tool 14. The housing 24 is adapted, by virtue of the threaded hole 36 in the sleeve 26, for attachment of the rotary tool 14 with the axis 42 of the rotary tool 14 extending through the housing 24 along the axis 44 of the housing 24.

Figure 1:
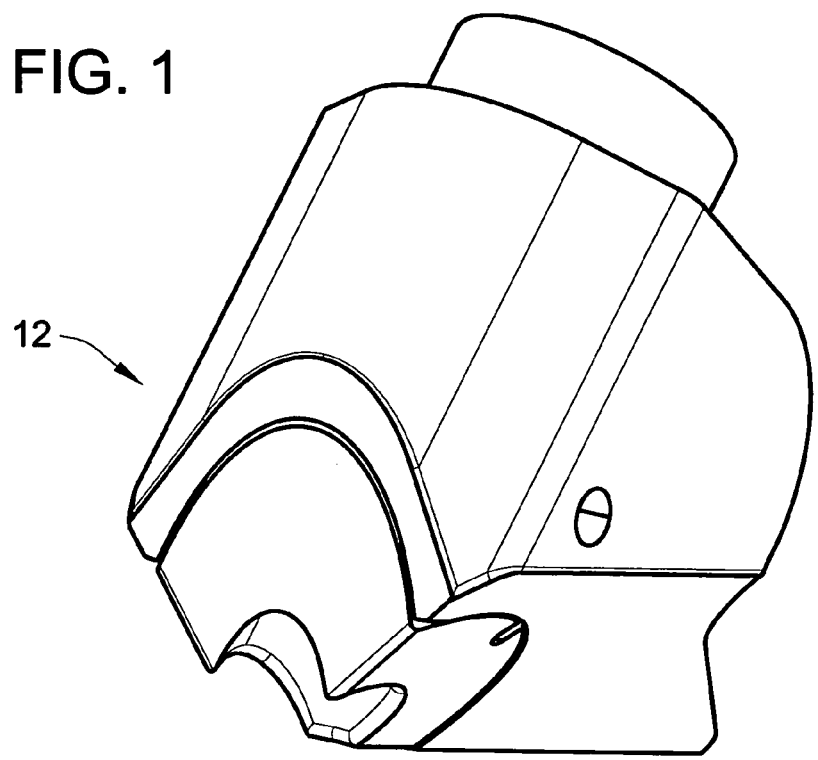
FIG. 1 is an isometric top right hand view of an exemplary embodiment of a corner cutting guide, in the form of a corner grout cutter guide, in accordance with a preferred embodiment of the present invention.
Figure 2:
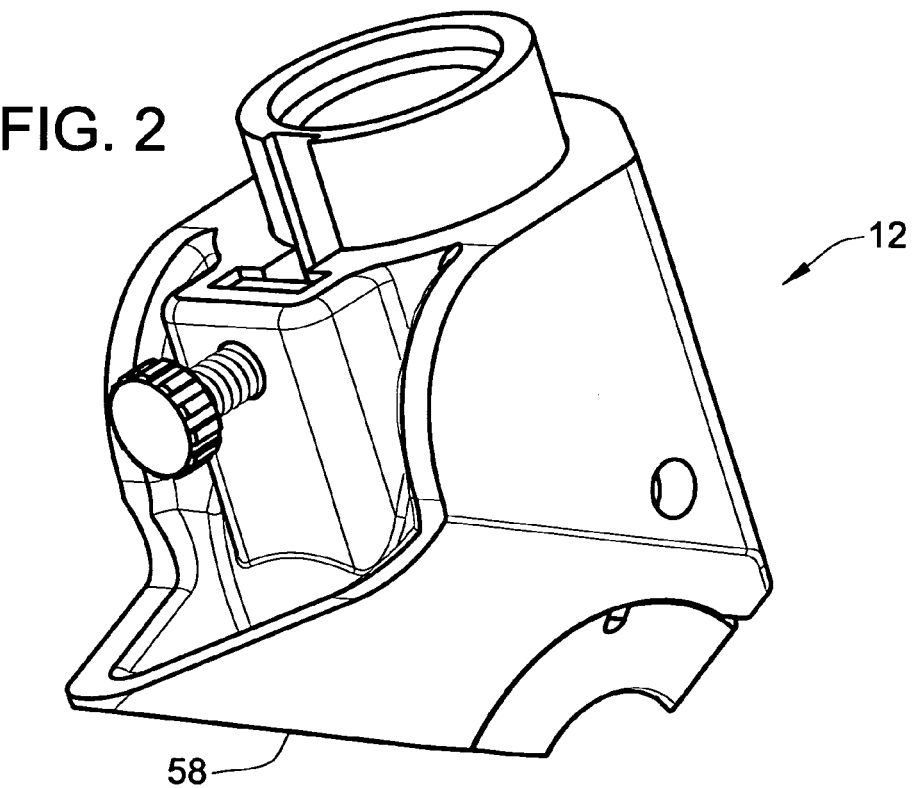
FIG. 2 is an isometric bottom left hand view of the corner grout cutter guide shown in FIG. 1.
Figure 6:
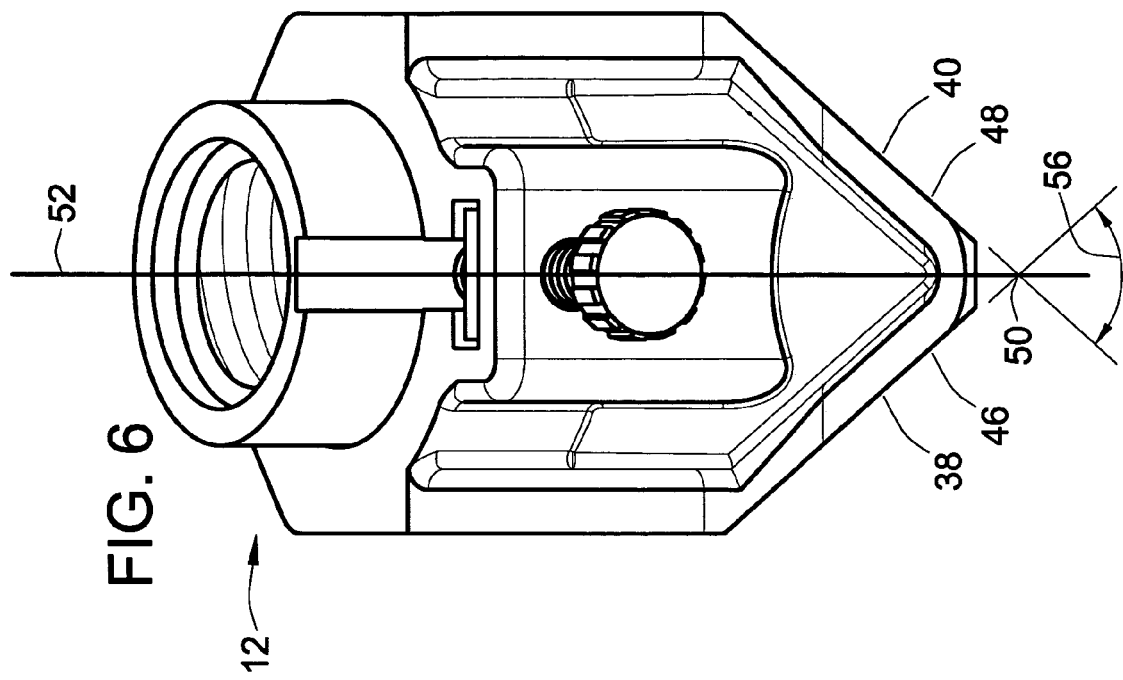
FIG. 6 is a rear view of the corner grout cutter guide shown in FIG. 1, illustrating how a screw clamps a mounting sleeve to a surface positioning guide base.

As best seen in FIGS. 3–6, and 8, the housing 24 also defines first and second guide walls 38, 40, which are adapted for engaging abutting walls at a corner of the work surface. As shown in FIG. 6, the first and second guide walls 38, 40 of the housing 24 are disposed substantially perpendicular to one another, and have respective outer surfaces 46, 48 thereof which, if projected, would intersect to form a line 50, as shown in FIGS. 5 and 6, lying in a common plane 52 (as shown in FIG. 6) with the axis 44 of the housing 24 and oriented at an acute angle 54 to the axis 44 of the housing 24.

As shown in FIG. 6, in the exemplary embodiment of the corner cutting guide 12, the included angle 56 formed by the outer surfaces 46, 48 of the guide walls 38, 40 is bisected by the common plane 52 that includes the axis 44 of the housing 24 and the line 50 formed by the intersection of the projections of the outer surfaces 46, 48 of the guide walls 38, 40 of the housing 24, but in other embodiments of the invention, the common plane 52 need not bisect the included angle 56.

The outer surfaces 46, 48 of the guide walls 46, 48 of the housing 24 may be made perpendicular to one another, in some embodiments of the invention. In the exemplary embodiment of the corner cutting guide 12, however, the included angle 56 formed by the outer surfaces 46, 48 of the guide walls 38, 40 is slightly less than perpendicular to allow the corner cutting guide 12 to fit into corners of walls that are less than perpendicular to one another.

As will also be noted, the housing 24 is blunted, as shown by surface 58 in FIGS. 2–4 and 8, to provide clearance between the corner cutting guide and irregularities in the corner of the work surface, such as a bead of grout to be removed or repaired. In the exemplary embodiment, the blunting is formed by a flat surface 58, but other embodiments of the invention may use other forms of blunting, such as curved surfaces, concave surfaces, grooves, etc., to provide clearance for irregularities in the corner.

As shown in FIGS. 3–5 and 10, the housing 24 further defines a forwardmost surface 60, thereof that does not extend forward of an intersection 62 formed by the axis 44 of the housing 24 and the line 50 formed by the intersections of the projected outer surfaces 46, 48 of the first and second guide walls 38, 40 of the housing 24. As illustrated in FIG. 5, by virtue of having the housing 24 configured in this manner, a bit extending along the axis 44 of the housing 24 can be guided into a common corner formed by three walls, with the first and second guide walls 38, 40 of the housing 24 abutting or closely adjacent to respective first and second walls of the corner, and the forwardmost surface 60 of the housing 24 abutting or closely adjacent to a third wall of the corner, as represented by line 64 in FIG. 5.

Those having skill in the art will also recognize that, although invention has been described herein with reference to several exemplary embodiments, many other embodiments of the invention are possible. For example, a corner cutting guide according to the invention, can be made from materials other than plastic, such as metal. The corner cutting guide, in a corner cutting apparatus, according to the invention, may also be incorporated integrally into the outer enclosure of a rotary tool of the corner cutting apparatus.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A corner cutting guide for a hand-held rotary hand tool having a grippable outer enclosure and a collet that is rotatable about an axis of the rotary tool and adapted for receiving a bit for engaging a work surface, the corner cutting guide comprising:
   a housing defining an axis of the housing and adapted for attachment of the rotary tool with the axis of the rotary tool extending through the housing along the axis of the housing and the outer enclosure of the rotary hand tool being exposed as the primary means for gripping and manipulating the rotary hand tool with the corner cutting guide attached thereto; and
   a sleeve adapted for coupling to the rotary tool;
   wherein the housing includes an opening for receiving the sleeve and is adapted for locking the sleeve in a plurality of longitudinal positions along the axis of the housing;
   the housing also having first and second substantially linear guide walls thereof for engaging abutting walls at a corner of the work surface;
   the first and second guide walls of the housing being disposed substantially perpendicular to one another, and having respective outer surfaces thereof which if projected would intersect to form a line lying in a common plane with the axis of the housing and oriented at an acute angle to the axis of the housing.

2. The corner guide of claim 1, wherein the housing further defines a forwardmost surface thereof that does not extend forward of an intersection formed by the axis of the housing and the line formed by the intersections of the projected outer surfaces of the first and second guide walls of the housing.

3. The corner guide of claim 1, wherein an included angle formed by the outer surfaces of the guide walls is bisected by the common plane including the axis of the housing and the line formed by the intersection of the outer surfaces of the guide walls of the housing.

4. The corner guide of claim 3 wherein the included angle formed by the outer surfaces of the guide walls is substantially equal to 90 degrees.

5. The corner guide of claim 3, wherein the included angle formed by the outer surfaces of the guide walls is slightly less than 90 degrees.

6. The corner guide of claim 3, wherein the intersection of the guide wall outer surfaces is blunted along a portion of the intersection.

7. A corner cutting apparatus comprising:
   a hand-held rotary hand tool having a grippable outer enclosure and a collet that is rotatable about an axis of the rotary tool and adapted for receiving a bit for engaging a work surface; and
   a corner cutting guide comprising, a housing defining an axis of the housing and adapted for attachment of the rotary tool with the axis of the rotary tool extending through the housing along the axis of the housing and the outer enclosure of the rotary hand tool being exposed as the primary means for gripping and manipulating the rotary hand tool with the corner cutting guide attached thereto;
   the housing also having first and second substantially linear guide walls thereof for engaging abutting walls at a corner of the work surface;
   the first and second guide walls of the housing being disposed substantially perpendicular to one another, and having respective outer surfaces thereof which if projected would intersect to form a line lying in a common plane with the axis of the housing and oriented at an acute angle to the axis of the housing;
   the corner cutting guide further comprises a sleeve adapted for coupling to the rotary tool; and
   the housing includes an opening for receiving the sleeve and is adapted for locking the sleeve in a plurality of longitudinal positions along the axis of the housing.

8. The corner cutting apparatus of claim 7, wherein the housing further defines a forwardmost surface thereof that does not extend forward of an intersection formed by the axis of the housing and the line formed by the intersections of the projected outer surfaces of the first and second guide walls of the housing.

9. The corner cutting apparatus of claim 7, wherein an included angle formed by the outer surfaces of the guide walls is bisected by the common plane including the axis of the housing and the line formed by the intersection of the outer surfaces of the guide walls of the housing.

10. The corner cutting apparatus of claim 9 wherein the included angle formed by the outer surfaces of the guide walls is substantially equal to 90 degrees.

11. The corner cutting apparatus of claim 9, wherein the included angle formed by the outer surfaces of the guide walls is slightly less than 90 degrees.

12. The corner cutting apparatus of claim 9, wherein the intersection of the guide wall outer surfaces is blunted along a portion of the intersection.

* * * * *